United States Patent
Compton et al.

(10) Patent No.: US 10,126,508 B2
(45) Date of Patent: Nov. 13, 2018

(54) FIBER OPTIC CONNECTORS HAVING A FERRULE WITH AN INTEGRAL FERRULE INSERTION STOP

(71) Applicant: Corning Optical Communications LLC, Hickory, NC (US)

(72) Inventors: Brandon Duvall Compton, Granite Falls, NC (US); Micah Colen Isenhour, Lincolnton, NC (US); Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/455,540

(22) Filed: Mar. 10, 2017

(65) Prior Publication Data

US 2017/0261699 A1 Sep. 14, 2017

Related U.S. Application Data

(60) Provisional application No. 62/306,377, filed on Mar. 10, 2016.

(51) Int. Cl.
*G02B 6/38* (2006.01)

(52) U.S. Cl.
CPC .......... *G02B 6/3869* (2013.01); *G02B 6/387* (2013.01); *G02B 6/3821* (2013.01); *G02B 6/3825* (2013.01); *G02B 6/3831* (2013.01); *G02B 6/3874* (2013.01); *G02B 6/3877* (2013.01); *G02B 6/3887* (2013.01); *G02B 6/3893* (2013.01); *G02B 6/3894* (2013.01); *G02B 6/3855* (2013.01)

(58) Field of Classification Search
CPC .. G02B 6/3821; G02B 6/3825; G02B 6/3874; G02B 6/387
See application file for complete search history.

(56) References Cited

U.S. PATENT DOCUMENTS

| | | | |
|---|---|---|---|
| 4,684,205 | A | 8/1987 | Margolin et al. |
| 5,129,023 | A | 7/1992 | Anderson et al. |
| 5,179,608 | A | 1/1993 | Ziebol et al. |
| 5,261,019 | A | 11/1993 | Beard et al. |

(Continued)

FOREIGN PATENT DOCUMENTS

| GB | 2468442 A | 9/2010 |
|---|---|---|
| JP | 2013218103 A | 10/2013 |

(Continued)

*Primary Examiner* — Daniel Petkovsek
(74) *Attorney, Agent, or Firm* — Michael E. Carroll, Jr.

(57) ABSTRACT

A ferrule-based fiber optic connectors having a connector assembly with a ferrule having an integral ferrule insertion stop for limiting the insertion of the ferrule into a ferrule sleeve are disclosed. In one embodiment, the fiber optic connector comprising a connector assembly, a connector sleeve assembly and a female coupling housing. The connector assembly comprises a ferrule and a resilient member for biasing the ferrule forward and the connector sleeve assembly comprises a housing and a ferrule sleeve, where the ferrule of the connector assembly is at least partially disposed in the ferrule sleeve when assembled. The ferrule has an integral ferrule insertion stop that limits the depth that the ferrule may be inserted into the ferrule sleeve.

30 Claims, 15 Drawing Sheets

(56) References Cited

U.S. PATENT DOCUMENTS

| | | | |
|---|---|---|---|
| 5,317,663 A | 5/1994 | Beard et al. | |
| 5,436,995 A * | 7/1995 | Yoshizawa | G02B 6/3869 385/136 |
| 5,542,015 A | 7/1996 | Hultermans | |
| 5,671,310 A | 9/1997 | Lin et al. | |
| 5,781,680 A | 7/1998 | Womack et al. | |
| 5,862,282 A | 1/1999 | Matsuura et al. | |
| 6,048,103 A | 4/2000 | Furukata et al. | |
| 6,126,325 A * | 10/2000 | Yamane | G02B 6/421 385/70 |
| 6,152,608 A | 11/2000 | Ghara et al. | |
| 6,347,888 B1 * | 2/2002 | Puetz | G02B 6/3825 385/53 |
| 6,579,014 B2 | 6/2003 | Melton et al. | |
| 6,652,156 B2 * | 11/2003 | Shinagawa | G02B 6/3869 385/77 |
| 6,712,523 B2 | 3/2004 | Kimmel | |
| 7,090,406 B2 | 8/2006 | Melton et al. | |
| 7,113,679 B2 | 9/2006 | Melton et al. | |
| 7,244,066 B2 * | 7/2007 | Theuerkorn | G02B 6/3825 385/53 |
| 8,047,726 B2 * | 11/2011 | Tamekuni | G02B 6/3846 385/53 |
| 8,070,367 B2 | 12/2011 | Winberg et al. | |
| 8,480,310 B2 | 7/2013 | Kewitsch | |
| 8,870,469 B2 | 10/2014 | Kachmar | |
| 9,069,140 B2 | 6/2015 | Park | |
| 9,297,976 B2 * | 3/2016 | Hill | G02B 6/3826 |
| 9,612,407 B2 * | 4/2017 | Kobayashi | G02B 6/3869 |
| 9,921,375 B2 * | 3/2018 | Compton | G02B 6/3821 |
| 2002/0181889 A1 | 12/2002 | Ozeki et al. | |
| 2009/0185779 A1 | 7/2009 | Gurreri et al. | |
| 2011/0085764 A1 | 4/2011 | Greub et al. | |
| 2013/0114931 A1 | 5/2013 | Mitchell et al. | |
| 2013/0163934 A1 * | 6/2013 | Lee | G02B 6/3879 385/78 |
| 2014/0205241 A1 | 7/2014 | Nielson | |
| 2016/0324402 A1 | 11/2016 | Yajima | |
| 2017/0254962 A1 | 9/2017 | Mueller-Schlomka et al. | |
| 2017/0261696 A1 | 9/2017 | Compton et al. | |
| 2017/0261698 A1 * | 9/2017 | Compton | G02B 6/3874 |

FOREIGN PATENT DOCUMENTS

| | | |
|---|---|---|
| WO | 2013173273 A1 | 11/2013 |
| WO | 2014133837 A1 | 9/2014 |

* cited by examiner

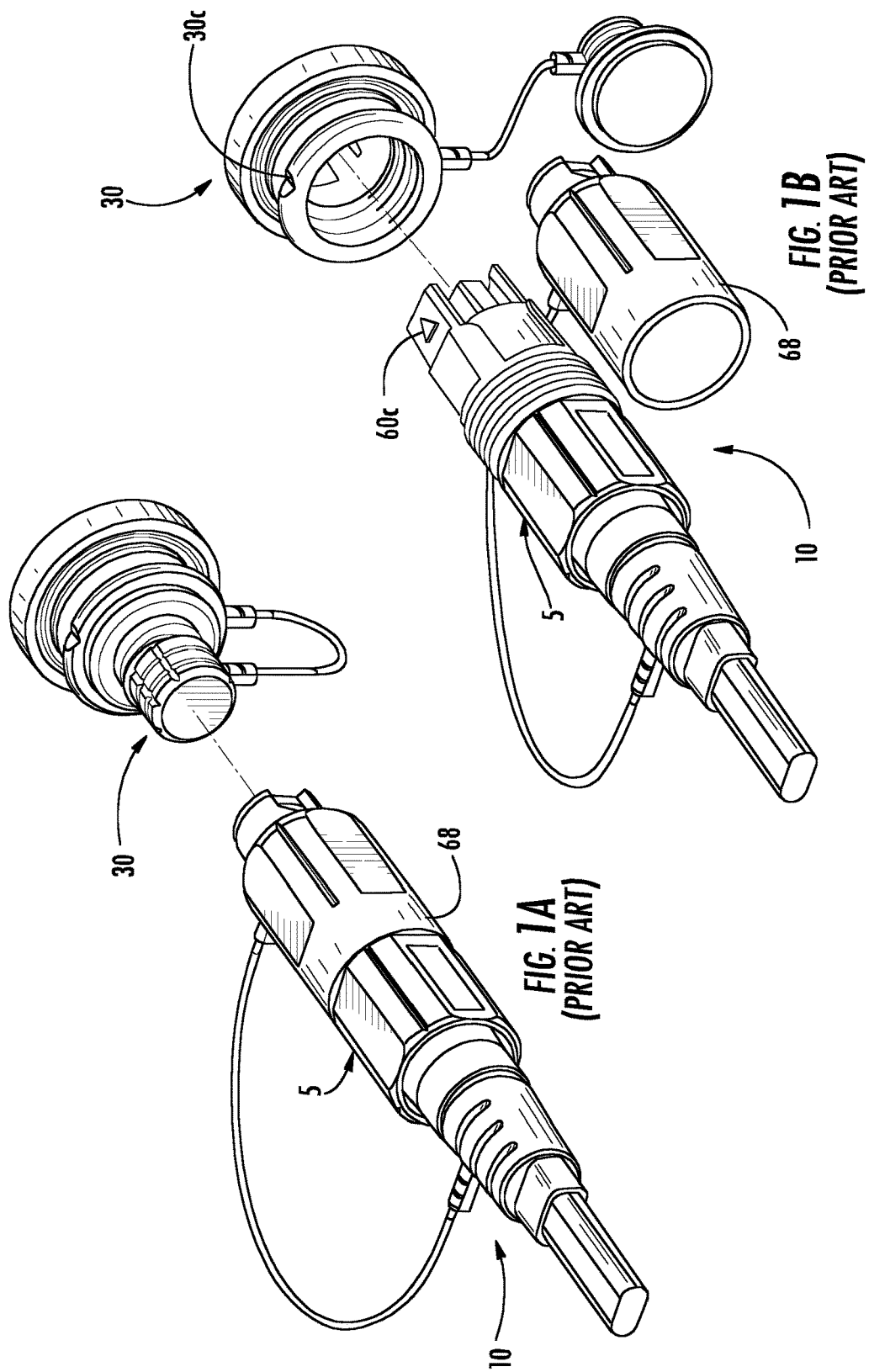

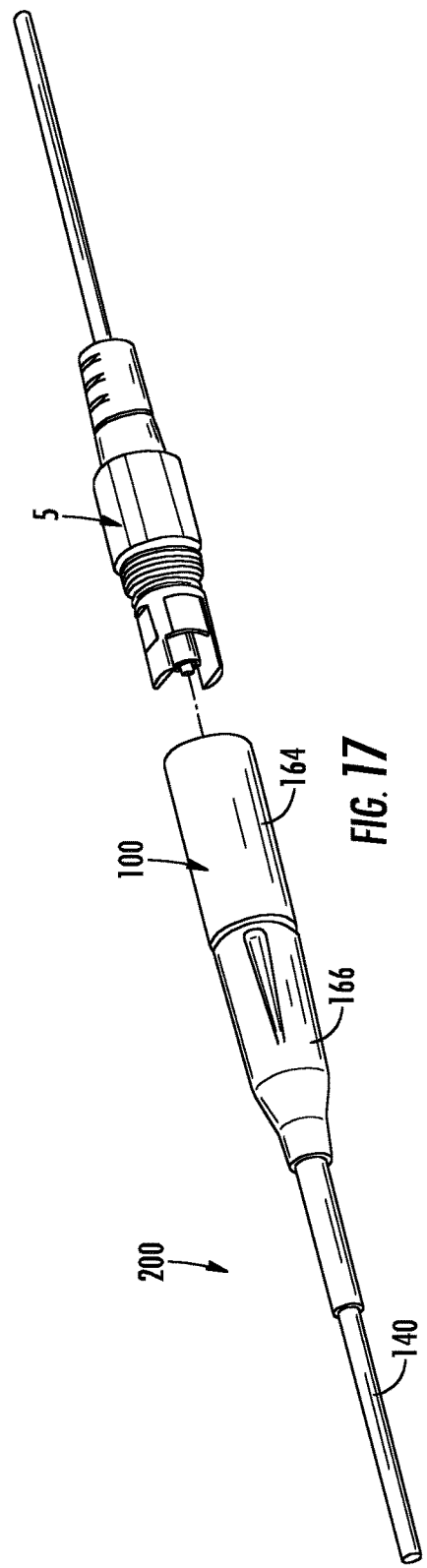

FIBER OPTIC CONNECTORS HAVING A FERRULE WITH AN INTEGRAL FERRULE INSERTION STOP

CROSS-REFERENCE TO RELATED APPLICATIONS

This application claims the benefit of priority under 35 U.S.C. § 119 to U.S. Provisional Application No. 62/306,377, filed on Mar. 10, 2016, the content of which is relied upon and incorporated herein by reference.

BACKGROUND

The disclosure is directed to fiber optic connectors having a translatable ferrule with one or more optical fibers along with cable assemblies using the fiber optic connectors. More specifically, the disclosure is directed to ferrule-based fiber optic connectors having a balanced ferrule retraction characteristic for preserving optical performance.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for the outside the plant environment hardened fiber optic connectors were developed. One of the most commercially successful hardened fiber optic connectors is the OptiTap® male plug connector sold by Corning Cable Systems, LLC of Hickory, N.C., such as disclosed in U.S. Pat. Nos. 7,090,406 and 7,113,679 (the '406 and '679 patents) and incorporated herein by reference. The Optitap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection such as a SC connector.

FIGS. 1A-1C are prior art depictions showing various stages of mating of a preconnectorized cable 10 having a plug connector 5 such as an OptiTap® connector with a receptacle 30. Receptacle 30 mates plug connector 5 with a standard SC connector (i.e., a non-hardened connector) at a second end (not visible in these views) using an adapter sleeve for aligning ferrules when mating plug connector 5 with the a non-hardened connector. Protection of the non-hardened connector side of the receptacle is typically accomplished by mounting the receptacle 30 through a wall of an enclosure or the like so that the non-hardened end of the receptacle is disposed inside the enclosure for environmental protection of the non-hardened connector. As shown by FIGS. 1A-1C, the other end of the receptacle 30 is accessible for receiving the plug connector 5 at the wall of the enclosure. Other applications may mount the receptacle 30 inside an enclosure on a bracket or the like.

Receptacle 30 allows an optical connection between the hardened connector such as the OptiTap® male plug connector with a non-hardened connector such as the SC connector at nodes in the optical network that typically transition from an outdoor space to an indoor space. FIG. 2 depicts an exploded view of receptacle 30, which is described in further detail in U.S. Pat. No. 6,579,014. As depicted, receptacle 30 includes a receptacle housing 12 and an adapter sleeve 18 disposed therein. The receptacle 30 receives a non-hardened connector at a second end 16 as represented by the arrow pointing to the left Adapter sleeve 18 is biased toward a first end 14 of the receptacle 30 that receives the connector 5 using springs 38. This biasing of the adapter sleeve 18 toward the first end 14 that receives the plug connector 5 is used for maintaining physical ferrule-to-ferrule contact between the plug connector and the SC connector to increase the "float" between the mating ferrules. When mated, the ferrule of the plug connector 5 is not latched to the adapter sleeve and springs 38 of receptacle 30 are used for increasing the "float" between the mating ferrules of the plug connector and the non-hardened connector and is used because.

Network operators often desire to optically connect a first hardened connector to another hardened connector in a space that requires a rugged connection point, which receptacle 30 is incapable of accomplishing. Consequently, there exists an unresolved need for fiber optic connectors that can mate directly with to another hardened connector in a quick and reliable manner while providing a ruggedized solution that preserves optical performance.

SUMMARY

The disclosure is directed to ferrule-based fiber optic connectors comprising a ferrule having an integral ferrule insertion stop for inhibiting the loading-up of the ferrule displacement within one of the fiber optic connectors, which can cause undue optical attenuation when mated with a complementary connector. The concepts disclosed are useful for hardened fiber optic connectors that mate directly to hardened plug connectors, but may also be used with other types of connectors as desired. As an example the concepts are useful with a female hardened connector that mates with a hardened plug connector, but other applications for the concepts disclosed are possible and advantageous as well. Thus, the concepts disclosed also allow a compact footprint and reliable performance for fiber optic connectors.

One aspect of the disclosure is directed to a fiber optic connector including a connector assembly including a housing, a ferrule and a resilient member for biasing the ferrule forward. The ferrule includes an integral ferrule insertion stop. The fiber optic connector further includes a first shell and a second shell for securing the connector assembly at a front end of the shells, and a connector sleeve assembly including a housing having one or more features configured for attaching to the connector assembly and a passageway between a first end and a second end along with a ferrule sleeve. When assembled, the ferrule of the connector assembly is at least partially disposed in the ferrule sleeve.

Another aspect of the disclosure is directed to a fiber optic connector including a connector assembly including a housing, a ferrule and a resilient member for biasing the ferrule forward. The ferrule includes an integral ferrule insertion stop. The fiber optic connector further includes a first shell and a second shell for securing the connector assembly at a front end of the shells, and a connector sleeve assembly including a housing having one or more features configured for attaching to the connector assembly and a passageway between a first end and a second end along with a ferrule sleeve. When assembled, the ferrule of the connector assembly is at least partially disposed in the ferrule sleeve when assembled. The fiber optic connector further includes a female coupling housing having an opening for receiving a complementary connector.

Still another aspect is directed to a fiber optic connector including a connector assembly including a housing, a ferrule and a resilient member for biasing the ferrule forward. The ferrule has an integral ferrule insertion stop configured as a circumferential ledge about a portion of the ferrule such that a diameter of the integral ferrule insertion stop is greater than a diameter of a main portion of the ferrule. The fiber optic connector further includes a first shell and a second shell for securing the connector assembly at a front end of the shells, and a connector sleeve assembly including a housing having one or more features configured for attaching to the connector assembly and a passageway between a first end and a second end along with a ferrule sleeve. When assembled, the ferrule of the connector assembly is at least partially disposed in the ferrule sleeve when assembled. The fiber optic connector further includes a female coupling housing having an opening for receiving a complementary connector. Additionally, the integral ferrule insertion stop is positioned along a length of the ferrule such that at least a minimum gap is present between an end of the ferrule sleeve closest to the integral ferrule insertion stop and an end of the housing of the connector sleeve assembly.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 1A-1C show portions of a conventional preconnectorized fiber drop cable having a hardened connector such as an OptiTap® male plug connector being inserted into and connected with a conventional receptacle for alignment and mating the hardened connector with a non-hardened connector;

FIG. 17 is a perspective view of the cable assembly of FIG. 4 being aligned with a complementary connector for mating.

DETAILED DESCRIPTION

Reference will now be made in detail to the embodiments of the disclosure, examples of which are illustrated in the accompanying drawings. Whenever possible, like reference numbers will be used to refer to like components or parts.

The fiber optic connectors and cable assemblies described herein are suitable for making optical and/or optical-electrical connections (if electrical connections are included in the connectors) to a conventional male hardened plug connector Although the concepts disclosed herein are explained with respect to a female hardened fiber optic connector used for optical connection with the male hardened plug connector an OptiTap connector, the concepts disclosed may be used with other fiber optic connectors hardened or not and are not limited to this particular optical connection.

The concepts of the disclosure advantageously allow robust and reliable optical connections for ferrule-based fiber optic connectors by limiting the ferrule insertion depth into a ferrule sleeve and inhibiting the loading-up of the ferrule displacement in the fiber optic connector that can occur during assembly and/or during mating, thereby avoiding undue optical attenuation. As explained below, the ferrule retraction (i.e., displacement during mating) in ferrule-based fiber optic connectors depend on several factors, but the concepts disclosed inhibit the loading-up of ferrule displacement in the fiber optic connector by limiting the insertion depth of the ferrule into the ferrule sleeve.

Figure 1C:
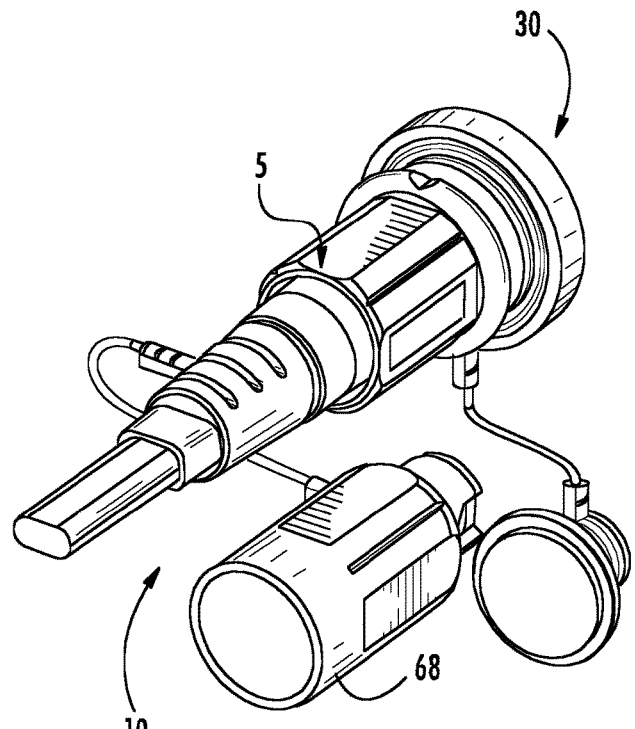
Figure 2:
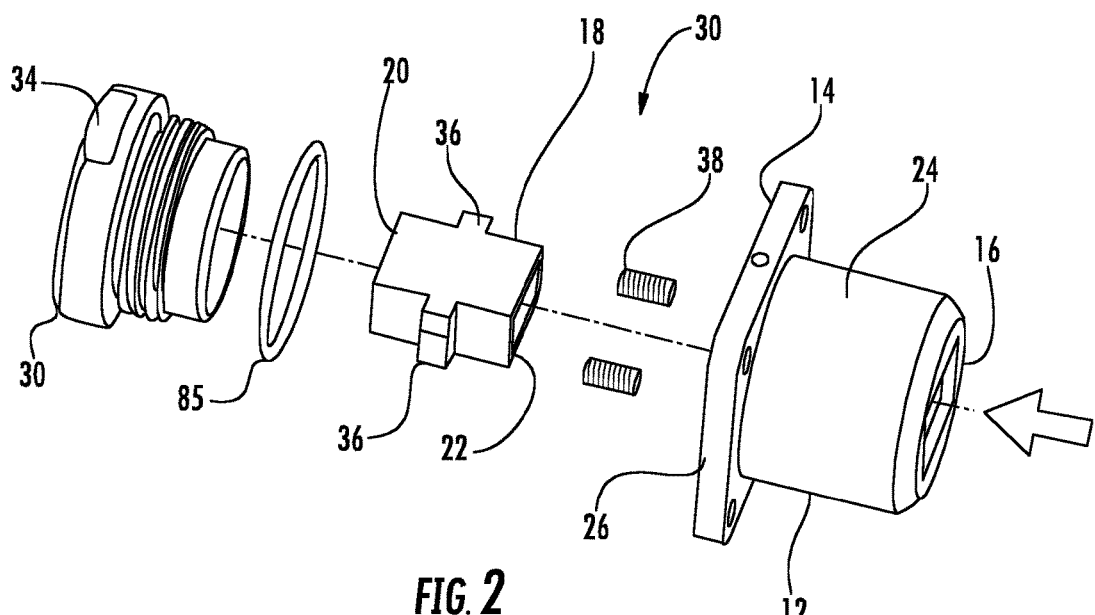
FIG. 2 is a partially exploded view of a conventional receptacle such as depicted in FIGS. 1A-1C for mating a hardened connector with a non-hardened connector.
Figure 3:
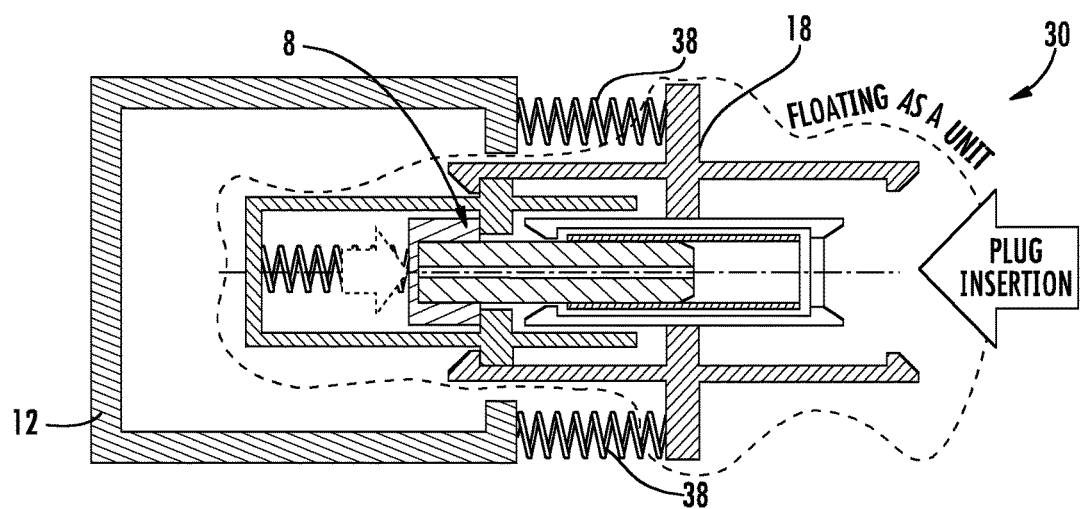
FIG. 3 is a schematic force-loading diagram for the conventional receptacle of FIG. 2 with its floating biasing spring construction according to the prior art.

For explanatory purposes, the operation of the prior art receptacle 30 of FIG. 2 is explained using a schematic force-loading diagram of FIG. 3. FIG. 3 is a schematic force-loading diagram for the conventional receptacle 30 of FIG. 2 depicting its "floating biasing spring" construction for mating a hardened connector with a non-hardened connector. In the "floating biasing spring" construction of receptacle 30 the non-hardened connector 8 floats as a unit with adapter sleeve 18. FIG. 3 depicts a dashed line drawn around the adapter sleeve 18 and the non-hardened connector 8 and the dashed line represents that the adapter sleeve 18 and non-hardened connector 8 "floating as a unit" within a receptacle housing 12 according to conventional receptacle 30 of the prior art. As shown, springs 38 bias the floating unit toward a first end 14 of the receptacle 30 that receives the plug connector 5. The arrow of FIG. 3 pointing to the left represents the insertion direction of the hardened connector such as plug connector 5 being inserted into receptacle 30.

The problem with conventional connectors is that, typically, one connector assembly having a ferrule is pre-inserted into the connector sleeve assembly creating a fiber optic connector. Later a mating connector is inserted into fiber optic connector. Although both of the mating connector assemblies of fiber optic connector and the mating plug connector represented by the arrow are similar, the behavior of the individual connector assemblies of the plug connector and the fiber optic connector are not similar during mating. The ceramic based ferrules of fiber optic connectors are axially aligned for physical contact during mating using a ferrule sleeve having a precision-fit with the ferrules that are inserted therein. However, this ferrule sleeve is positioned within a housing of the connector sleeve assembly so that it is "loosely captive" within the housing. "Loosely captive" means that the ferrule sleeve is held within the housing such that it has no impediment to expanding as a ferrule enters, along with having space to accommodate variations in the initial mating angle of mating ferrules, and the ferrule sleeve may also move axially. These movements of the ferrule sleeve are required to allow alignment and proper mating of the ferrule faces for inhibiting undue optical attenuation in the mating connectors.

There is a friction force between the ceramic ferrule and ferrule sleeve that must be overcome during assembly. Consider the ferrule of the first fiber optic connector being "prepositioned" within the ferrule sleeve so its endface is disposed about halfway into the length of the ferrule sleeve. The ferrule sleeve being "loosely captive" within the housing is "pushed" during this "prepositioning" to the farthest point within the housing away from the inserted ferrule (i.e., to the far end) where it awaits the complementary mating ferrule. The ferrule sleeve will not move on its own from this position due to the static friction force between ferrule sleeve and ferrule of the connector assembly.

When the mating ferrule of the complementary connector encounters the ferrule sleeve of the first fiber optic connector during mating, the mating ferrule causes the ferrule sleeve to "open" to receive the mating ferrule. Generally speaking, the ferrule sleeve typically has a lead-in feature such as a chamfer to ease this initial transition. Once"open" the mating ferrule may be inserted into the ferrule sleeve until it encounters the ferrule of the first fiber optic connector for physical contact during mating. However, it is likely that the mating ferrules/ferrule sleeve are displaced from a generally centered position, which can cause undue optical attenuation and/or other performance issues. For instance, the mating ferrule of the plug connector may be displaced by a distance than is greater than the design parameters of the plug connector being mated with the first fiber optic connector. Although the connectors may still be mated, this uneven displacement of ferrules is undesirable and may cause elevated levels of optical attenuation, reduce reliability and/or cause other issues for the mated connectors.

The present application solves this problem of unbalanced displacement of ferrules during mating by providing fiber optic connectors with a ferrule having an integral ferrule insertion stop as disclosed herein.

Figure 4:
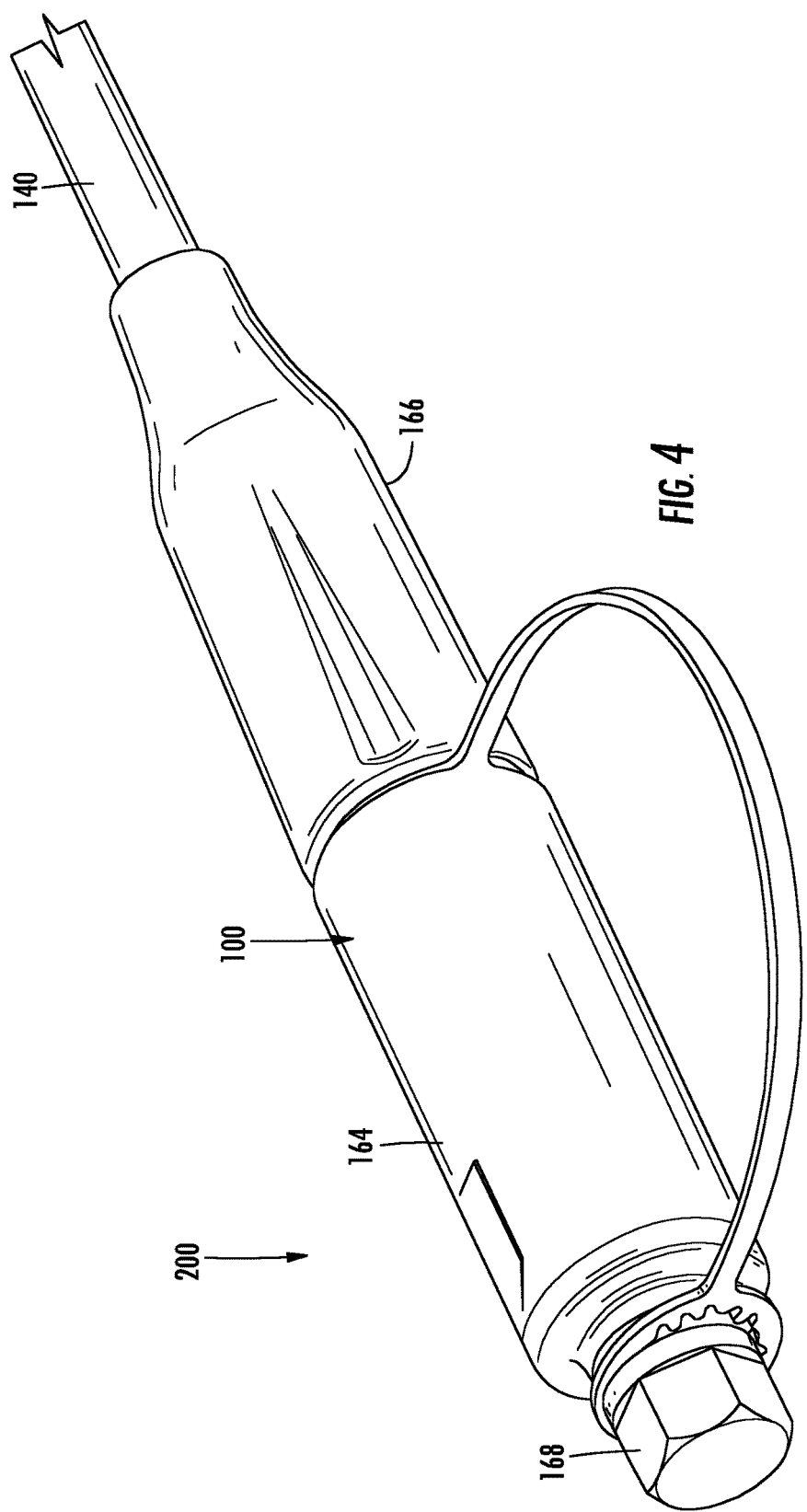
FIG. 4 is a perspective view of cable assembly having an explanatory fiber optic connector according to the concepts disclosed.
Figure 5:
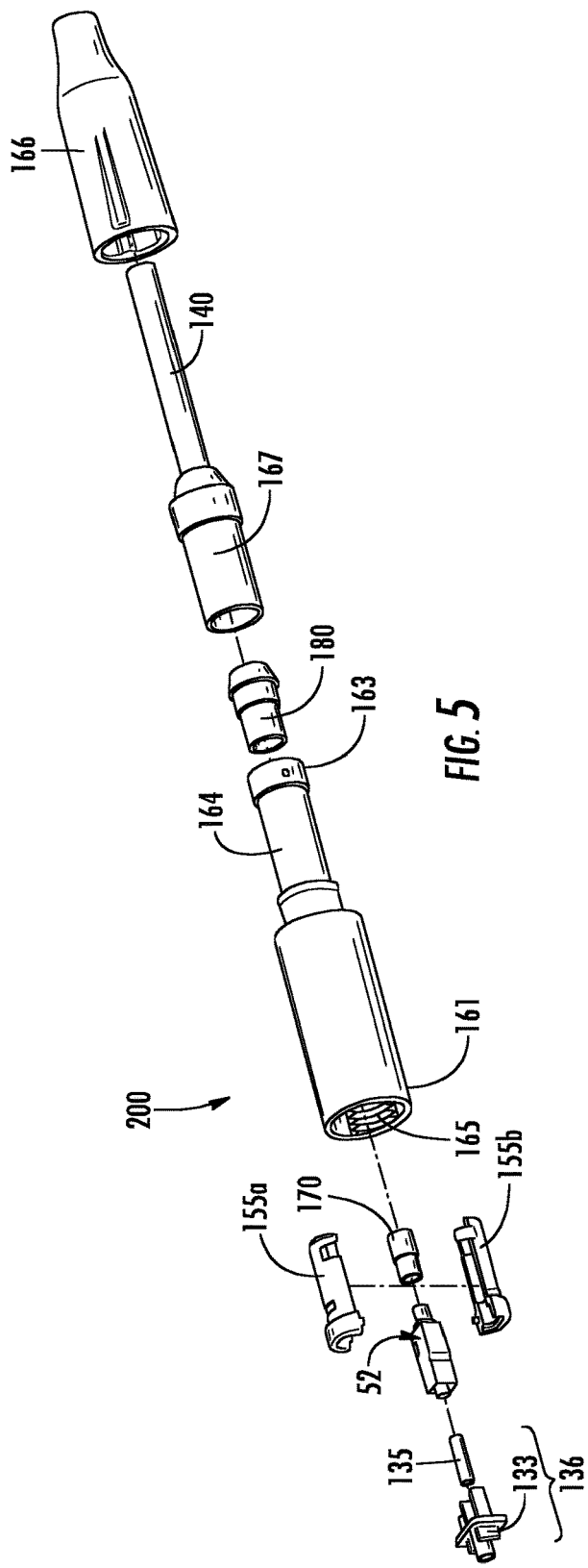
FIG. 5 is an exploded view of cable assembly of FIG. 4.
Figure 6:
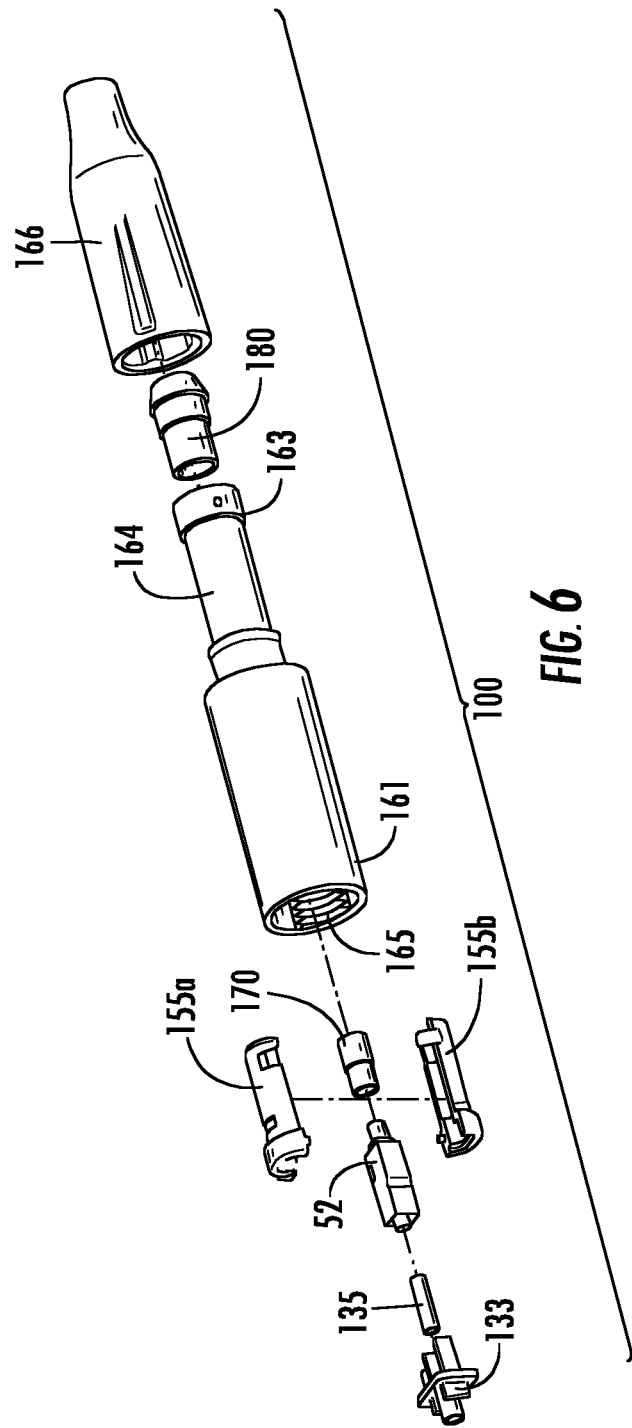
FIG. 6 is an exploded view of the fiber optic connector of FIG. 4.
Figure 7:
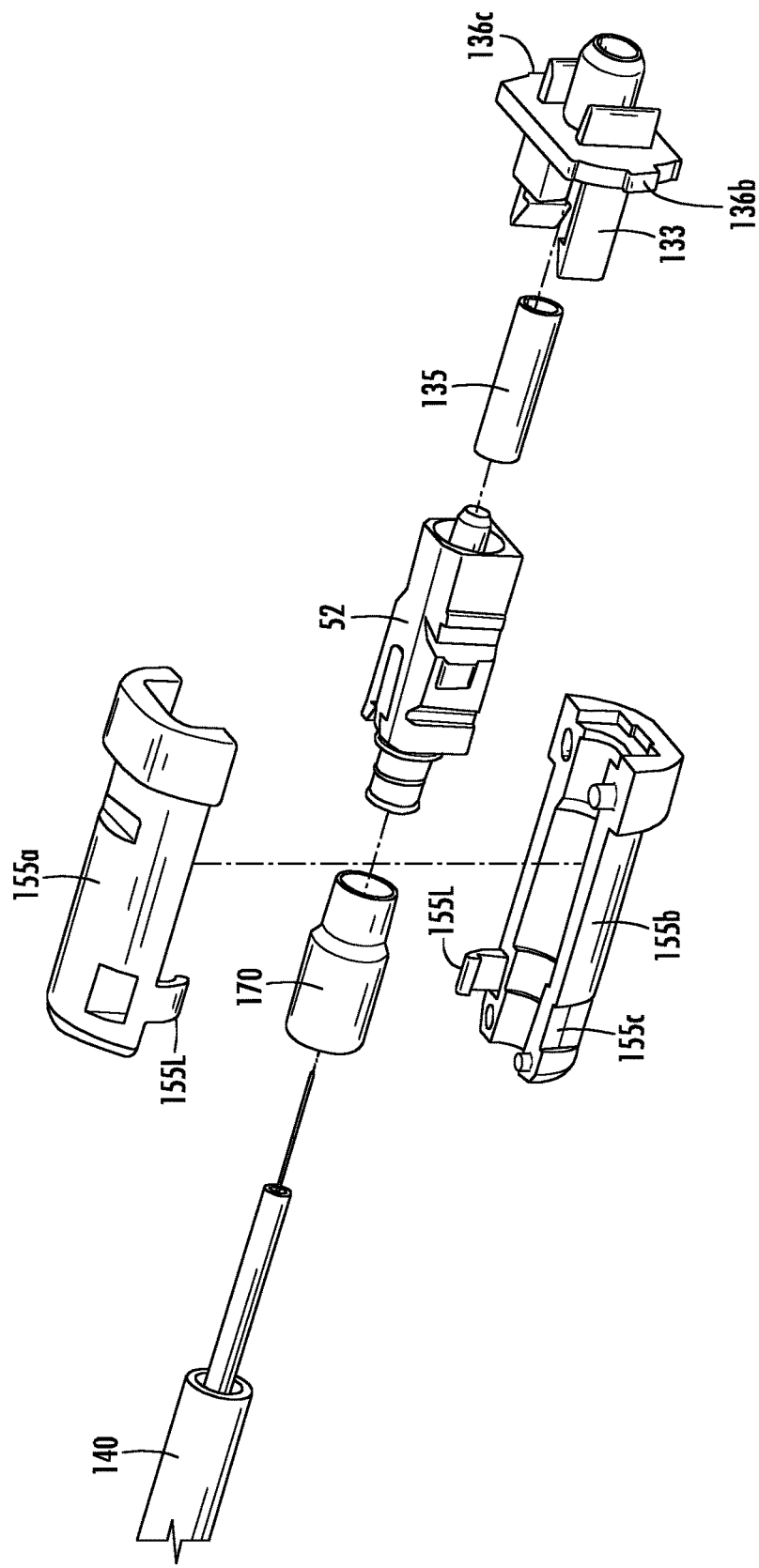
FIG. 7 is a partial detailed exploded view depicting select components of the fiber optic connector of FIG. 4.

FIG. 4 is a perspective view of cable assembly 200 having an explanatory fiber optic connector 100 (hereinafter "connector") attached to an end of fiber optic cable 140 (hereinafter "cable") and FIG. 5 is an exploded view of the cable assembly 200. FIG. 6 is an exploded view of the fiber optic connector 100 and FIG. 7 is a partial detailed exploded view depicting select components of the connector 100. FIG. 4 depicts connector 100 having a dust cap 168 attached thereto via threads that cooperate with a female coupling housing 164.

The construction and operation of connector 100 that is very different than the construction of receptacle 30 of FIG. 2 when mating to a complementary connector. Although the connector depicted is a hardened female connector for receiving a male hardened connector plug such as an Opti-Tap® connector for a direct optical connection, the concepts may be used with other suitable connectors as desired. The present application solves the issues of excess ferrule displacement within the ferrule sleeve by using a ferrule having an integral ferrule insertion stop to inhibit issues of excess ferrule displacement relative to the ferrule sleeve during assembly and mating.

In one embodiment, connectors having a construction according to the concepts disclosed comprise a connector assembly 52, and a connector sleeve assembly 136 as depicted in FIG. 5. Specific constructions of connectors according to the concepts disclosed maybe embodied in a variety of different connector constructions.

Figure 8:
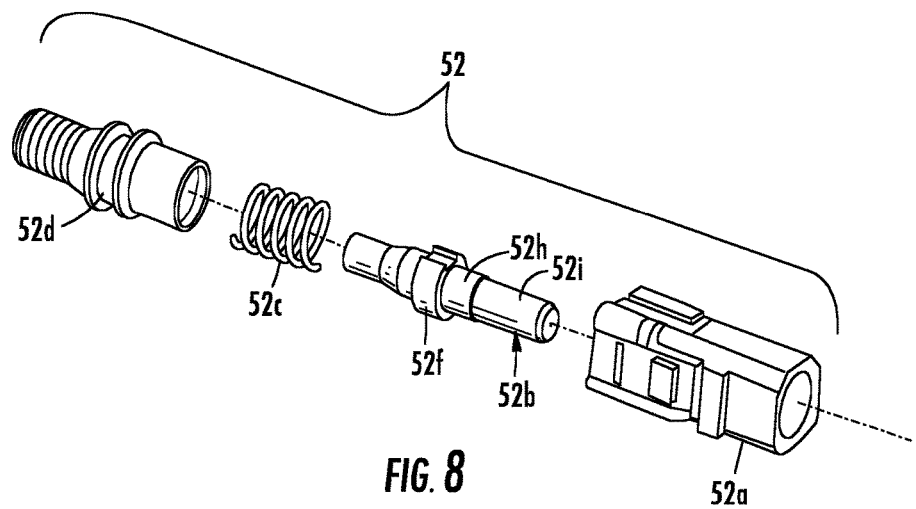
FIG. 8 is an exploded view of the connector assembly depicted in FIGS. 5-7.

Fiber optic connectors disclosed herein may include any suitable connector assembly. By way of example, and not limitation, suitable connector assemblies may include LC, SC along with other connector assemblies having a ferrule and ferrule sleeve arrangement as desired. As best shown in FIG. 8, the connector assembly 52 comprises a connector housing 52a, a ferrule 52b, and a resilient member 52c. The connector assembly 52 depicted is a SC connector assembly that also includes a spring push 52d and a ferrule holder 52f. Spring push 52d attaches to a portion of connector housing 52ia when assembled and allows resilient member 52c to bias the ferrule 52b (and the ferrule holder 52f) forward. Connectors disclosed herein are advantageous for efficiently and economically streamlining the deployment and installation of fiber optic networks since they provide a robust and reliable operation along with direct connection with a complementary connector. Moreover, using an industry standard connector assembly provides a known connector footprint for the fiber optic connectors.

As best shown in FIG. 6, connector 100 comprises connector assembly 52, connector sleeve assembly 136, a first shell 155a, a second shell 155b, and a female coupling housing 164. Connector sleeve assembly 136 comprises a housing 133 and a ferrule sleeve 135. Housing 133 comprises one or more features 133a configured for attaching to connector assembly 52 and a passageway 133p between a first end and a second end of the housing 133. By way of example, connector 100 may also comprise a cable adapter 180 and a boot 166. When assembled, the ferrule 52b of the connector assembly 52 is at least partially disposed in the ferrule sleeve 135.

Figure 9:
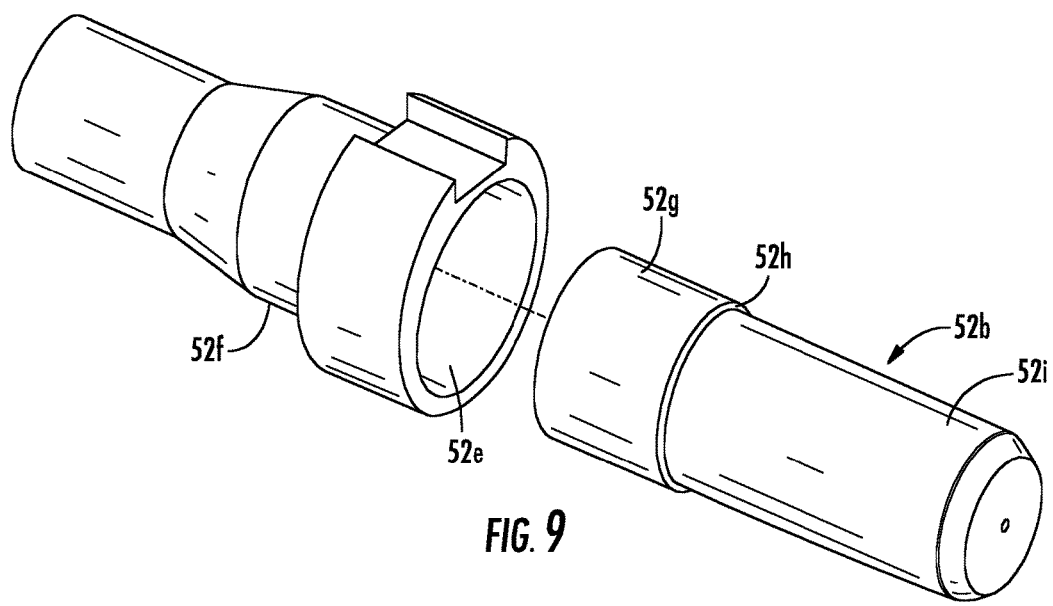
FIGS. 9 and 10 depict the ferrule assembly portion of the connector assembly of the fiber optic connector of FIG. 4 in exploded and assembled perspective views showing an integral ferrule insertion stop.
Figure 10:
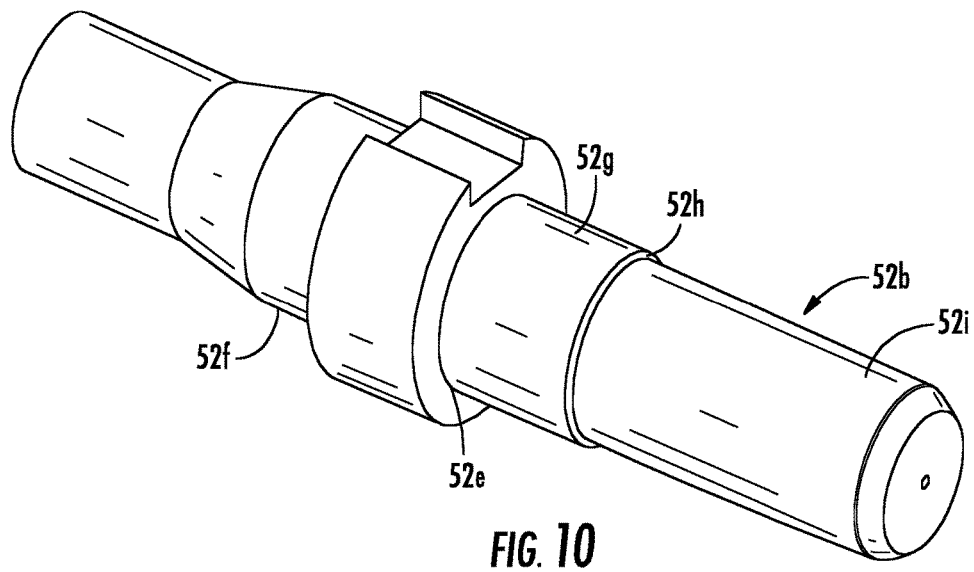

FIGS. 9 and 10 depict a first ferrule assembly portion of connector assembly 52 in an exploded and assembled perspective views. As depicted, ferrule holder 52f has a passageway 52e therethrough and is sized for receiving an end 52g of ferrule 52b. Ferrule 52b includes an integral ferrule insertion stop 52h that is located about a circumference of the ferrule 52b. As used herein, the term "integral ferrule insertion stop" means that the integral ferrule insertion stop 52h and ferrule 52b are a single, monolithic component. Integral ferrule insertion stop 52h may be formed in ferrule 52b by any appropriate means. As ferrule 52b may be fabricated from ceramic, integral ferrule insertion stop 52h may be formed by a molding process prior to firing and hardening ferrule 52b. Alternatively, integral ferrule insertion stop 52h may be fabricated after firing and hardening ferrule 52b.

Integral ferrule insertion stop 52h limits the insertion depth of the ferrule 52b into a ferrule sleeve 135 of the connector sleeve assembly 136 and inhibits over-insertion of the ferrule, thereby inhibiting undue optical attenuation of due to excessive ferrule displacement relative to the ferrule sleeve 135. More particularly, the integral ferrule insertion stop 52*h* prevents the end of the ferrule sleeve 135 from contacting an end of the housing 133 of the connector sleeve assembly 136. In embodiments, the position of the integral ferrule insertion stop 52*h* on the ferrule 52*b* is such that at least a minimum gap is maintained between an end of the ferrule sleeve 135 that is closest to the integral ferrule insertion stop 52*h* and the housing 133 of the connector sleeve assembly 136. Consequently, neither ferrule of the mated ferrules have an excess displacement within the ferrule sleeve 135 when the optical connection is made.

In the illustrated embodiment, integral ferrule insertion stop 52*h* is configured as a circumferential ledge about a circumference of ferrule 52*b*. A main portion 52*i* of ferrule 52*b* extends from integral ferrule insertion stop 52*h*. The position of the integral ferrule insertion stop 52*h* is such that the main portion 52*i* of the ferrule 52*b* has a desired insertion length. As depicted, a diameter of the integral ferrule insertion stop 52*h* is greater than a diameter of the main portion 52*i* of ferrule 52*b*. FIG. 10 depicts the assembled ferrule assembly with the integral ferrule insertion stop 52*h* that acts to limit the insertion depth of the ferrule 52*b* into the ferrule sleeve 135 of connector 100 when assembled.

Figure 11A:
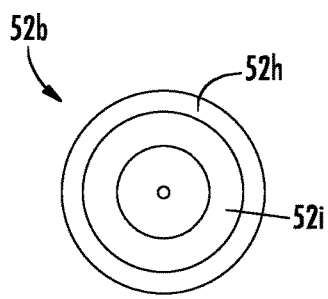
FIG. 11A is a front view of the ferrule having an integrated ferrule insertion stop depicted in FIGS. 9 and 10.
Figure 11B:
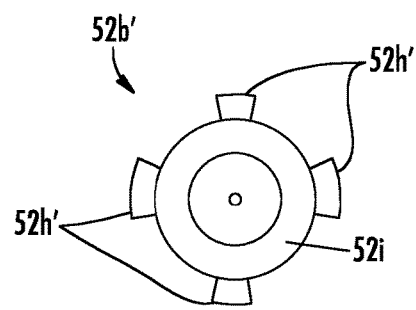
FIG. 11B depicts an alternative ferrule having a discontinuous integrated ferrule insertion stop.
Figure 11C:
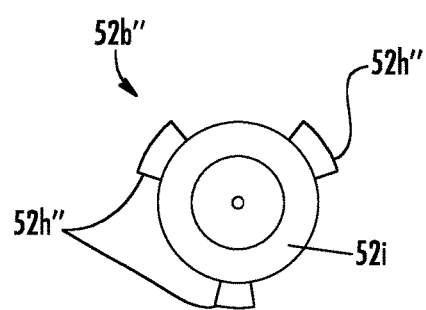
FIG. 11C depicts another alternative ferrule having a discontinuous integrated ferrule stop.

FIG. 11A depicts a front view of the ferrule 52*b* depicted in FIGS. 9 and 10. As depicted, the integral ferrule insertion stop 52*h* is configured as a continuous circumferential ledge about a circumference of ferrule 52*b*. Other suitable structures for the integral ferrule insertion stop 52*h* are also possible. FIG. 11B depicts a front view of an example alternative ferrule 52*b* having an integral ferrule insertion stop 52*h*' configured as a discontinuous ledge around a circumference of ferrule 52*b*'. Thus, the integral ferrule insertion stop 52*h*' is configured as four equally spaced ledges or ridges around a circumference of the main portion 52*i* of the ferrule 52*b*. FIG. 11C depicts a front view of another example alternative ferrule 52*b*" having an integral ferrule insertion stop 52*h*" configured as three equally spaced ledges or ridges around a circumference of the main portion 52*i* of the ferrule 52*b*". Any number of ledges or ridges may be equally or non-equally spaced around the ferrule 52*b*. Further, referring to FIGS. 9 and 10, the larger diameter of the integral ferrule insertion stop 52*h* may not fully extend to the end 52*g* of the ferrule 52*b*. Accordingly, the integral ferrule insertion stop 52*h* may be a narrower band than as depicted in FIGS. 9 and 10 such that a diameter at the end 52*g* may be similar to the diameter of the main portion 52*i*. Other configurations are also possible.

Figure 12:
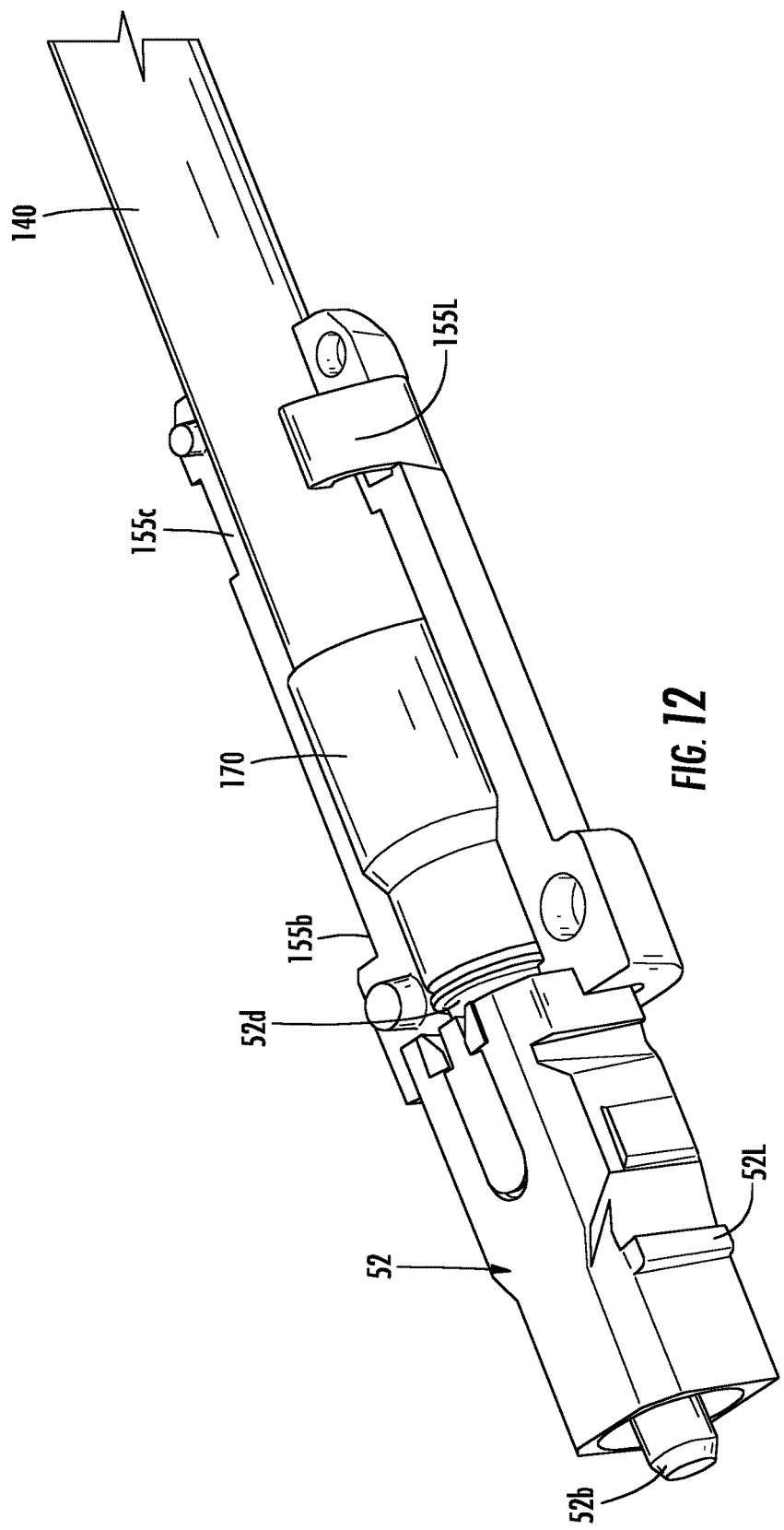
FIGS. 12-14 are perspective views showing the assembly of components for the fiber optic connector of FIG. 13.
Figure 13:
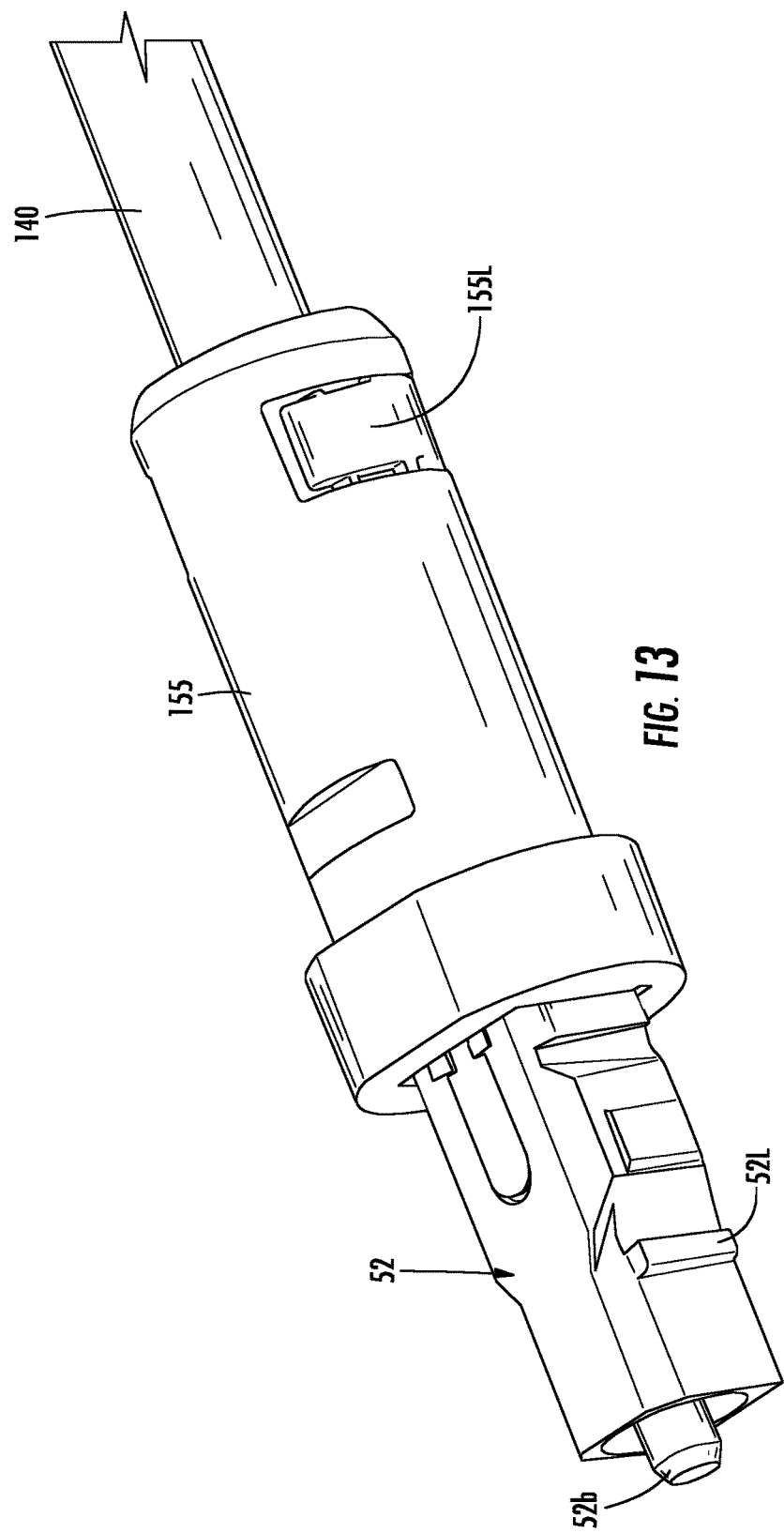
Figure 14:
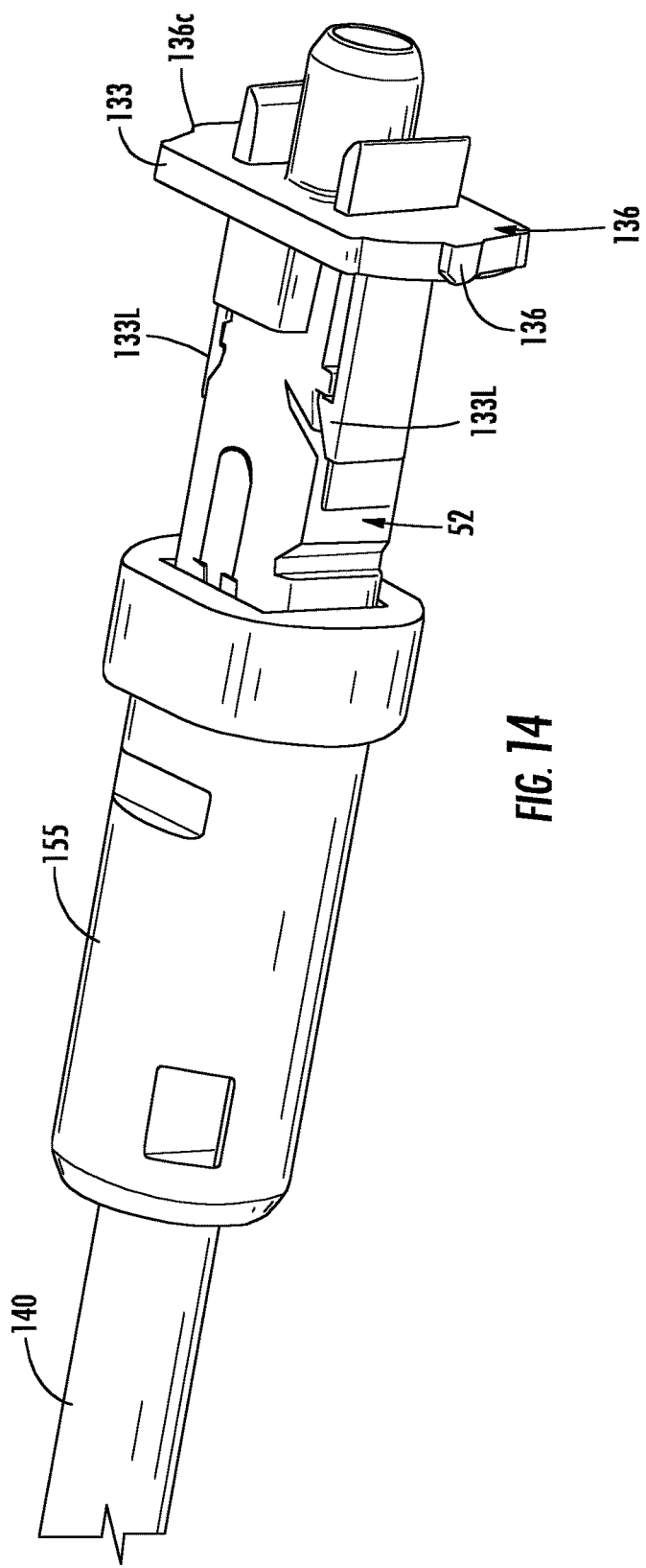
Figure 15:
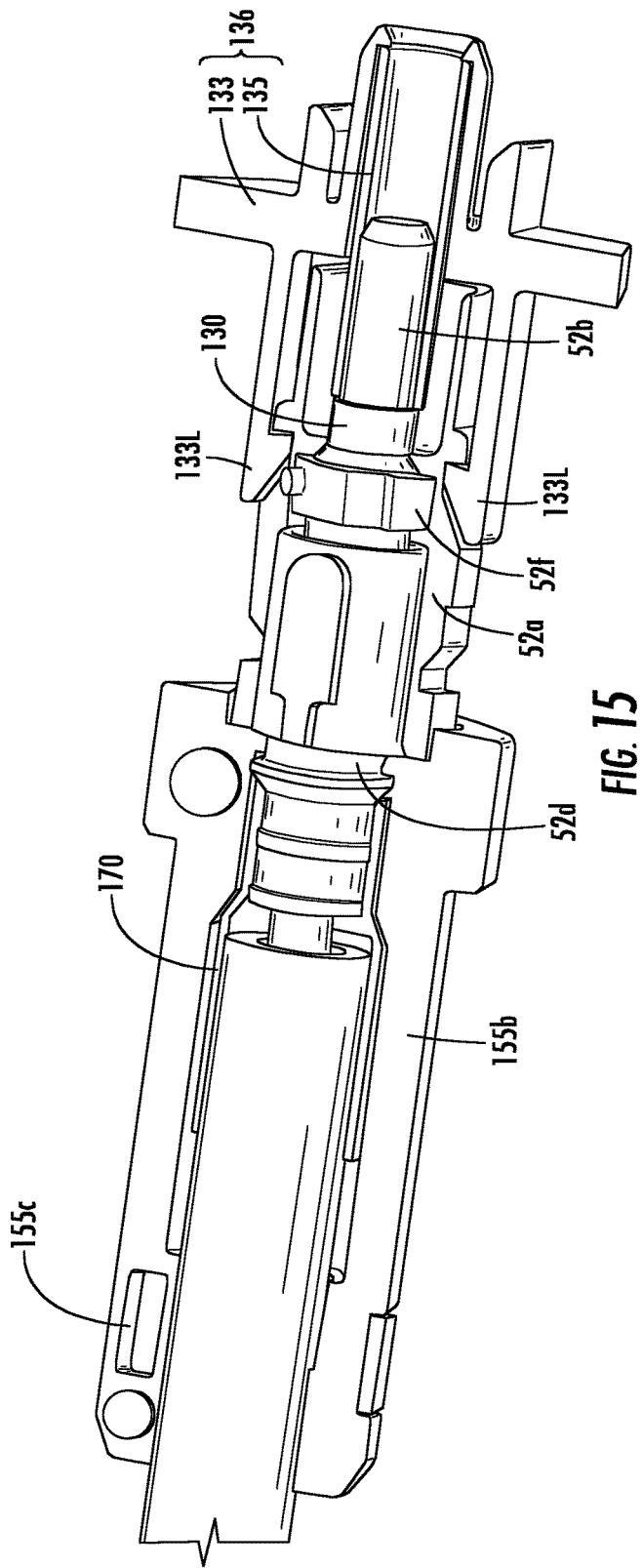
FIG. 15 is a partial sectional view of the assembly of FIG. 14.

FIGS. 12-14 are perspective views showing the assembly of components for connector 100 and FIG. 15 is a partial sectional view of the assembly of FIG. 14. FIG. 12 is a perspective view depicting cable 140 attached to connector assembly 52 and positioned in shell 155*b*. In this embodiment, cable 140 is secured to connector assembly 52 using a crimp band 170 that is attached to a portion of spring push 52*d*.

Cable 140 may comprise one or more optical fibers, one or more tensile elements such as strength members or strength components, and a cable jacket, but other suitable components are possible. The tensile elements of fiber optic cable 140 (not shown) are typically secured to a cable attachment region of connector 100 or connector assembly 52. In this embodiment, the strength members of cable 140 such as aramid yarns are positioned about a rear portion of spring push 52*d* and secured thereto using crimp band 170. However, cable 140 may be strain-relieved to connector 100 in other suitable manners. For instance, strength members or strength components may be secured to the body 155 such as by using a crimp band or an adhesive.

As shown in FIG. 13, connector 100 comprises a body 155 for securing the connector assembly 52 at a front end of one or more shells. In this embodiment, body 155 has a first shell 155*a* and a second shell 155*b* that form the body 155. Shells 155*a* and 155*b* may be the same part or not depending on the desired construction. In this embodiment, shells 155*a*,155*b* each comprise a latch 155L and a catch 155C for securing the first and second shells together in a snap-fit construction for ease of assembly. Other configurations for shells 155*a*,155*b* are also possible such as securing the shells with a crimp band or adhesive as desired. Connector 100 may also comprise other optionally components such as a cable boot 166, a heat shrink tube 167, a second crimp band, and/or one or more O-rings for sealing. For complexity reduction and simplification, the connector 100 can use many of the same parts as the OptiTap® plug connector 5 or other standard parts as desired; however, certain components may be specific to connector 100.

By way of explanation other embodiments of body 155 may have the shells secured with a crimp band that is deformed about an outer barrel portion of the body. Further, the crimp band may also be used for securing the tensile elements of cable 140. For instance, the tensile elements may be a plurality of tensile yarns attached between an outer barrel of body 155 and the crimp band. In other embodiments, one or more strength components such as GRP rods maybe secured to the cable attachment region of the fiber optic connector such as between the shells 155*a*,155*b*. Alternatively, two crimp bands may be used for cables or constructions where it is desired to strain-relieve the fiber optic cable directly to the connector assembly 52 and to the shells. By way of example, tensile elements such as aramid yarns may be secured to the connector assembly 52 as discussed herein and the second crimp band 153 is used for strain-relieving tensile elements to the body 155. Connectors may also include a dust cap 168, but other suitable configurations are possible using fewer or more components. For instance, connector 100 may also include an optional lanyard (not numbered) for the dust cap 168 as desired so it is prevented from being lost or separated from the assembly.

Generally speaking, most of the components of fiber optic connector 100 are formed from a suitable polymer, but other materials such as metal are possible. In one example, the polymer is a UV stabilized polymer such as ULTEM 2210 available from GE Plastics if the component is exposed to the elements; however, other suitable polymer materials are possible. For instance, stainless steel or any other suitable metal may be used for various components as desired.

FIG. 14 depicts the connector sleeve assembly 136 attached to the connector assembly 52. The housing 133 of connector sleeve assembly 136 may be formed as a single component as shown or formed as an assembly of more than one component. In this embodiment, the housing of 133 connector sleeve assembly 136 is formed a single component as best depicted in FIGS. 5-7, thereby making the features of the connector sleeve assembly easier to manufacture and assemble. However, the concepts disclosed herein may be used with any suitable connector sleeve assembly such as housing comprising several components if desired. As depicted, housing 133 also includes one or more latch arms 133*a* for securing the housing 133 with connector assembly 52.

The housing 133 of connector sleeve assembly 136 has a through passageway from a first end 131 to a second end 132 for receiving ferrule sleeve 135 in a loosely captive manner and aligning respective ferrules of the connector 100 and the mating connector as discussed herein. Specifically, when assembled, connector sleeve assembly 136 fits within female coupling housing 164 and is used for aligning ferrule 52b of connector 100 with the corresponding ferrule of the plug connector 5.

As best depicted in FIG. 15, ferrule sleeve 135 is disposed within housing 133 and the ferrule 52b of connector assembly 52 is at least partially disposed in the ferrule sleeve 135 when assembled.

In addition to the connector sleeve assembly 136 having a passageway between the first end 131 and the second end 132 it also includes one or more connector sleeve orientation features. Connector sleeve orientation features can have many different suitable constructions such as lugs, tabs, openings, etc. for cooperating with the one or more coupling housing orientation features on the female coupling housing. In the embodiment illustrated and best shown in FIG. 7, the housing 133 of connector sleeve assembly 136 includes a first lug 136b and a second lug 136c for fitting the connector sleeve assembly 136 into the female coupling housing 164. Stated another way, connector sleeve assembly 136 fits into female coupling housing 164 in only one orientation using first tab 136b and second tab 136c having different shapes as discussed below.

Connector 100 may also include a cable adapter 180 for easily allowing the use of different sizes or types of cables 140 with the connector 100. Cable adapter 180 is sized to fit within a rear opening of female coupling housing 164 and size the passageway for the particular cable desired for use with the connector 100. By way of explanation, if a different size or type of cable is desired for use with connector 100 the substitution of the correctly sized cable adapter may be the only part that requires changing for the use of the cable. Cable adapter 180 may be secured with an adhesive, friction fit, threads or the like.

Figure 16:
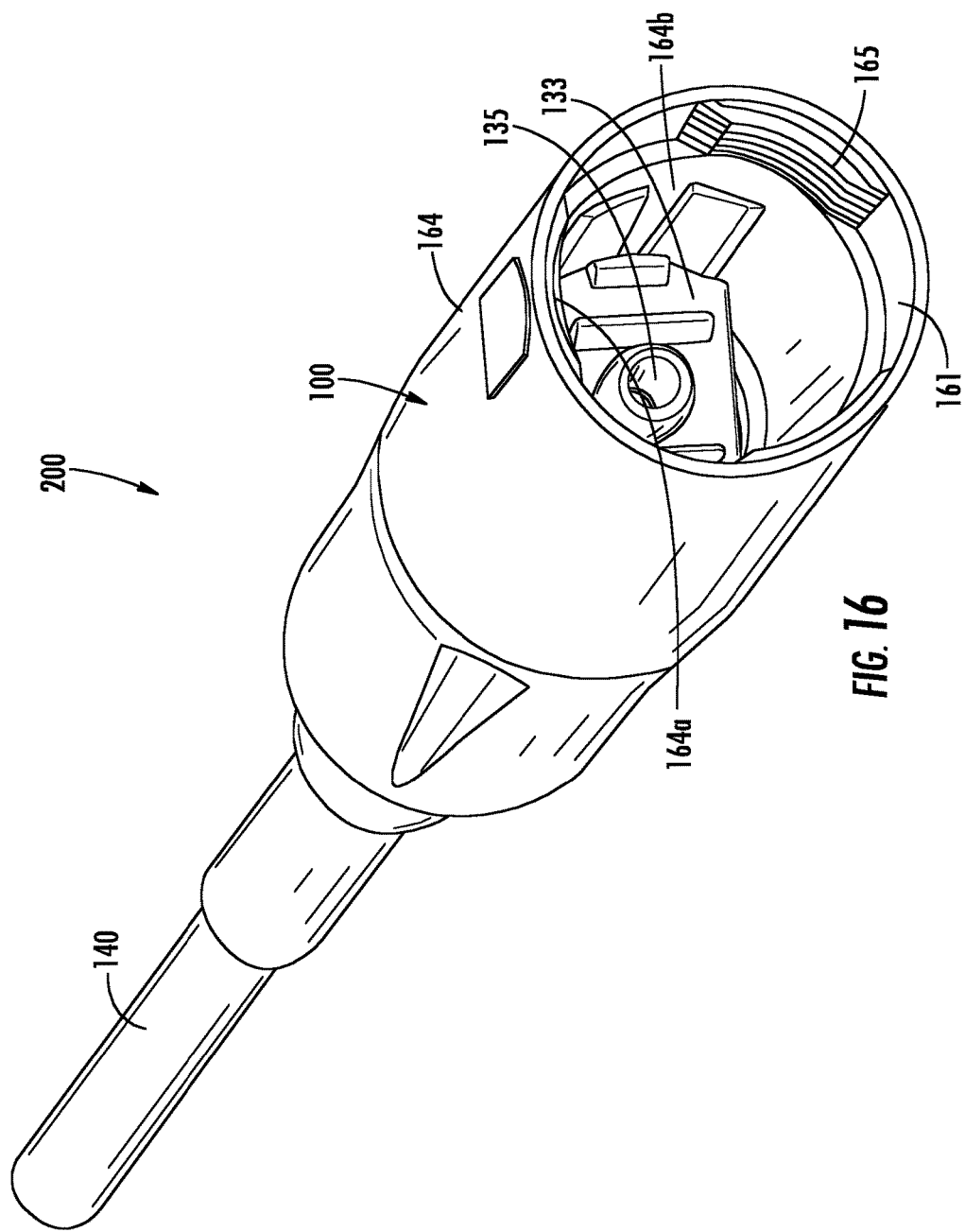
FIG. 16 is an end perspective view of the cable assembly of FIG. 4 with the dust cap removed.

FIG. 16 is an end perspective view of the cable assembly 200 showing connector 100 with the dust cap removed. Female coupling housing 164 of connector 100 may have any suitable construction for the fiber optic connector using the concepts disclosed herein. The female coupling housing 164 is sized for receiving the male plug connector 5 within the front end opening for direct optical mating. Fiber optic connector 100 has a relatively small form factor and aligns the plug connector 5 in the proper orientation so it may only mates in one direction. Further, the optical coupling between the connector 100 and the plug connector 5 is environmentally sealed. Additionally, fiber optic connector 100 may be optically coupled and uncoupled with plug connector 5 as desired.

As best shown in FIG. 16, female coupling housing 164 has an elongate structure with a passageway 163 extending from the opening at a front end 161 to a rear end 162 and sized so that the shroud of the plug connector 5 fits into the front end 161 of passageway 163 when properly aligned. Consequently, plug connector 5 may be directly mated with the fiber optic connector 100 for making an optical connection therebetween. As shown, female coupling housing 164 includes a first portion at the front end that includes the internal attachment feature such as internal threads 165 that cooperate directly with the complementary external threads of plug connector 5. Once the plug connector 5 is attached to the fiber optic connector 100 the assembly is suitable for making an optical connection therebetween.

Female coupling housing 164 includes features for aligning and securing connector sleeve assembly 136 along with alignment features for correctly orientating plug connector 5. In one embodiment, female coupling housing 164 includes a stop ledge 164a integrally formed in a side wall (i.e., disposed on the side wall) that is disposed rearward of internal threads 165. Stop ledge 164a is configured so that it only allows the shroud of plug connector 5 to fully seat within the female coupling housing 164 in one orientation for keying the optical coupling. In other words, the shroud of the plug connector 5 has alignment fingers having different shapes and the stop ledge 164a only allows the plug connector 5 to fully seat for optical coupling in one orientation by preventing insertion of the larger alignment finger into the female coupling housing 164 past the stop ledge 164a. Female coupling housing 164 also includes a shelf (not visible) within the passageway and disposed rearward of the stop ledge 164a. Shelf 164d has a complementary shape for receiving connector sleeve assembly 136 and includes a first retention feature 164b and a second retention feature 164c. First retention feature 164b and second retention feature 164c have different sizes that cooperate with tabs 136b, 136c disposed on connector sleeve assembly 136 so that it may only fully seat into the female coupling housing 164 in one orientation. Further, the stop ledge 164a has a specific orientation relative to first retention feature 164b and second retention feature 164c.

When fully assembled the body 155 fits into female coupling housing 164 and is keyed to direct the insertion of the same into the coupling housing 164 in the correct orientation. In this case, shells 155a include planar surfaces on opposite sides of body 155 to inhibit relative rotation between body 155 and female coupling housing 164. In other embodiments, the body 155 may be keyed to the female coupling housing 164 using other configurations such as a complementary protrusion/groove or the like.

The rear end of housing 164 includes second portion (not numbered) having a reduced cross-section. The second portion is used for securing heat shrink tubing 167 (the heat shrink tubing is depicted in the shrunk form in FIG. 5) for providing environmental protection between the housing 164 and the fiber optic cable 140 and weatherproofing the cable assembly. The other end of heat shrink tubing 167 is disposed about a portion of the cable, thereby inhibiting water from entering connector 100. Further, the second portion allows for the attachment of boot 166 to the rear end of the female coupling housing 164. After the heat shrink tubing 167 is attached, boot 166 may be slid over heat shrink tubing 167. Specifically, boot 166 may be positioned over the shrink tubing 167 at rear end 162 of female coupling housing 164 for providing further bending strain relief for the cable assembly.

Boot 166 may be formed from a flexible material such as KRAYTON or the like. Heat shrink tubing 167 and boot 166 generally inhibit kinking and provide bending strain relief to the cable 140 near connector 100. Boot 166 has a longitudinal passageway (not visible) and may have a stepped profile therethrough. The first end of the boot passageway is sized to fit over the heat shrink tubing 167. The first end of the boot passageway has a stepped down portion sized for cable 140 or other suitable cable that may be used and the heat shrink tubing 167 and acts as stop for indicating that the boot is fully seated. Dust cap 168 has external threads for engaging the internal threads of female coupling housing 164 for attachment and thereby inhibit dirt and debris from entering the connector 100 via the front end 161 of female coupling housing 164. Moreover, the dust cap 168 may include an O-ring for providing a weatherproof seal between fiber optic connector 100 and dust cap 168 when installed.

FIG. 17 is a perspective view of the cable assembly 200 being aligned with a complementary plug connector 5 for mating. As shown, the shroud of the male plug connector 5 has alignment fingers having different shapes and when mated the female coupling housing only allows the plug connector 5 to fully seat for optical coupling in one orientation by preventing insertion of the larger alignment finger into the female coupling housing 164 past the stop ledge. In one embodiment, the correct mating orientation is marked on the female coupling housing 164 such as an alignment indicia so that the craftsman can quickly and easily mate connector 100 with the plug connector 5. For instance, the alignment indicia may be an arrow or dot molded into the female coupling housing 164, however, other suitable indicia may be used. Thereafter, the craftsman engages the internal attachment feature 165 such as internal threads of female coupling housing 164 with the complementary external threads of plug connector 5 for making the optical connection.

Additionally, the optical connection is easily connected or disconnected by merely mating or unmating the plug connector 5 with the fiber optic connector 100 by threadly engaging or disengaging the coupling nut on the plug connector 5 with the attachment features 165 such as internal threads of the female coupling housing 164 of the fiber optic connector 100.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A fiber optic connector, comprising:
   a connector assembly comprising a housing, a ferrule and a resilient member for biasing the ferrule forward, the ferrule comprising an integral ferrule insertion stop;
   a first shell and a second shell for securing the connector assembly at a front end of the shells; and
   a connector sleeve assembly comprising a housing comprising one or more features configured for attaching to the connector assembly and a passageway between a first end and a second end, and a ferrule sleeve, wherein the ferrule of the connector assembly is at least partially disposed in the ferrule sleeve when assembled.

2. The fiber optic connector of claim 1, the integral ferrule insertion stop being a circumferential ledge about a portion of the ferrule.

3. The fiber optic connector of claim 2, wherein the circumferential ledge is continuous about the portion of the ferrule.

4. The fiber optic connector of claim 2, wherein the circumferential ledge is discontinuous about the portion of the ferrule.

5. The fiber optic connector of claim 1, wherein a diameter of the integral ferrule insertion stop is greater than a diameter of a main portion of the ferrule.

6. The fiber optic connector of claim 1, wherein the integral ferrule insertion stop is positioned along a length of the ferrule such that at least a minimum gap is present between an end of the ferrule sleeve closest to the integral ferrule insertion stop and the housing of the connector sleeve assembly.

7. The fiber optic connector of claim 1, wherein the housing of the connector sleeve assembly comprises one or more latch arms for attaching to a portion of the housing of the connector assembly.

8. The fiber optic connector of claim 1, further comprising a crimp band.

9. The fiber optic connector of claim 1, the connector assembly being an SC connector assembly.

10. The fiber optic connector of claim 1 being a portion of a cable assembly further comprising a fiber optic cable attached to the fiber optic connector.

11. The fiber optic connector of claim 1, further comprising a ferrule holder having a passageway for receiving an end of the ferrule.

12. A fiber optic connector, comprising:
    a connector assembly comprising a housing, a ferrule and a resilient member for biasing the ferrule forward, the ferrule comprising an integral ferrule insertion stop;
    a first shell and a second shell for securing the connector assembly at a front end of the shells;
    a connector sleeve assembly comprising a housing comprising one or more features configured for attaching to the connector assembly and a passageway between a first end and a second end, and a ferrule sleeve, wherein the ferrule of the connector assembly is at least partially disposed in the ferrule sleeve when assembled; and
    a female coupling housing comprising an opening for receiving a complementary plug connector.

13. The fiber optic connector of claim 12, the integral ferrule insertion stop being a circumferential ledge about a portion of the ferrule.

14. The fiber optic connector of claim 13, wherein the circumferential ledge is continuous about the portion of the ferrule.

15. The fiber optic connector of claim 13, wherein the circumferential ledge is discontinuous about the portion of the ferrule.

16. The fiber optic connector of claim 12, wherein a diameter of the integral ferrule insertion stop is greater than a diameter of a main portion of the ferrule.

17. The fiber optic connector of claim 12, wherein the integral ferrule insertion stop is positioned along a length of the ferrule such that at least a minimum gap is present between an end of the ferrule sleeve closest to the integral ferrule insertion stop and the housing of the connector sleeve assembly.

18. The fiber optic connector of claim 12, the housing of the connector sleeve assembly further comprising one or more connector sleeve orientation features that cooperate with one or more female coupling housing orientation features.

19. The fiber optic connector of claim 12, wherein the housing of the connector sleeve assembly comprises one or more latch arms for attaching to a portion of the housing of the connector assembly.

20. The fiber optic connector of claim 12, further comprising a crimp band.

21. The fiber optic connector of claim 12, the connector assembly being an SC connector assembly.

22. The fiber optic connector of claim 12 being a portion of a cable assembly further comprising a fiber optic cable attached to the fiber optic connector.

23. The fiber optic connector of claim 12, further comprising a ferrule holder having a passageway for receiving an end of the ferrule.

24. A fiber optic connector, comprising:
- a connector assembly comprising a housing, a ferrule and a resilient member for biasing the ferrule forward, the ferrule comprising an integral ferrule insertion stop configured as a circumferential ledge about a portion of the ferrule such that a diameter of the integral ferrule insertion stop is greater than a diameter of a main portion of the ferrule;
- a first shell and a second shell for securing the connector assembly at a front end of the shells;
- a connector sleeve assembly comprising a housing comprising one or more features configured for attaching to the connector assembly and a passageway between a first end and a second end, and a ferrule sleeve, wherein:
- the ferrule of the connector assembly is at least partially disposed in the ferrule sleeve when assembled; and
- the integral ferrule insertion stop is positioned along a length of the ferrule such that at least a minimum gap is present between an end of the ferrule sleeve closest to the integral ferrule insertion stop and the housing of the connector sleeve assembly; and
- a female coupling housing comprising an opening for receiving a complementary plug connector.

25. The fiber optic connector of claim 24, the housing of the connector sleeve assembly further comprising one or more connector sleeve orientation features that cooperate with one or more female coupling housing orientation features.

26. The fiber optic connector of claim 24, wherein the housing of the connector sleeve assembly comprises one or more latch arms for attaching to a portion of the housing of the connector assembly.

27. The fiber optic connector of claim 24, further comprising a crimp band.

28. The fiber optic connector of claim 24, the connector assembly being an SC connector assembly.

29. The fiber optic connector of claim 24 being a portion of a cable assembly further comprising a fiber optic cable attached to the fiber optic connector.

30. The fiber optic connector of claim 24, further comprising a ferrule holder having a passageway for receiving an end of the ferrule.

* * * * *

UNITED STATES PATENT AND TRADEMARK OFFICE
CERTIFICATE OF CORRECTION

| | | |
|---|---|---|
| PATENT NO. | : 10,126,508 B2 | Page 1 of 1 |
| APPLICATION NO. | : 15/455540 | |
| DATED | : November 13, 2018 | |
| INVENTOR(S) | : Brandon Duvall Compton et al. | |

It is certified that error appears in the above-identified patent and that said Letters Patent is hereby corrected as shown below:

In the Claims

In Column 11, Line 64, Claim 5, after "portion" insert -- of --.

Signed and Sealed this
Twenty-second Day of December, 2020

Andrei Iancu
*Director of the United States Patent and Trademark Office*